(12) United States Patent
Ortner et al.

(10) Patent No.: US 6,234,449 B1
(45) Date of Patent: May 22, 2001

(54) SELF CONTROLLING MAGNETIC VALVE

(75) Inventors: Johann Ortner, Villach; Johann Seemann, Villach-Landskron, both of (AT)

(73) Assignee: Interelektrik Ges.mbH & Co. KG, Villach (AT)

(*) Notice: Subject to any disclaimer, the term of this patent is extended or adjusted under 35 U.S.C. 154(b) by 0 days.

(21) Appl. No.: 09/194,863
(22) PCT Filed: Jun. 3, 1997
(86) PCT No.: PCT/EP97/02872
  § 371 Date: Jan. 11, 1999
  § 102(e) Date: Jan. 11, 1999
(87) PCT Pub. No.: WO97/46821
  PCT Pub. Date: Dec. 11, 1997

(30) Foreign Application Priority Data

Jun. 5, 1996 (DE) .............................. 196 22 626

(51) Int. Cl.⁷ .................................................. F16K 31/40
(52) U.S. Cl. ........................................... 251/35; 251/30.03
(58) Field of Search ................... 251/30.03, 35, 251/38, 45, 33

(56) References Cited

U.S. PATENT DOCUMENTS

| 3,593,957 | * | 7/1971 | Dolter et al. ....................... 251/30.03 |
| 4,387,878 | * | 6/1983 | Zukausky ........................... 251/30.03 |
| 4,534,537 | * | 8/1985 | Zukausky ........................... 251/30.03 |
| 5,599,003 | * | 2/1997 | Seeman et al. ..................... 251/30.03 |
| 5,732,929 | * | 3/1998 | Luppino et al. ........................ 251/38 |

FOREIGN PATENT DOCUMENTS

02113187 * 4/1990 (JP) ................................ F16K/31/40

* cited by examiner

Primary Examiner—Kevin Shaver
Assistant Examiner—Eric Keasel
(74) Attorney, Agent, or Firm—Milde Hoffberg & Macklin, LLP

(57) ABSTRACT

In an own-medium controlled magnetic valve (2) actuatable by an electromagnetically controlled pilot vale (46) for controlling liquids, having a main valve member (50) in the form of a differential piston and means to suppress pressure surges during the closure of the main valve (12) implying the cooperation of an overflow channel (68, 80, 82) with a limited passage cross section between both sides of the main valve member (50). The overflow channel consists at least partly of an elastic-walled choke channel (80) which can be increasingly narrowed by squeezing during the closure of the main valve (12). This ensures that the closing movement takes place rapidly and with enduring precision despite gentle closing.

10 Claims, 3 Drawing Sheets

SELF CONTROLLING MAGNETIC VALVE

BACKGROUND OF THE INVENTION

The invention has to do with a magnetic valve, in particular a self-controlling magnetic valve, which is actuated by an electromagnetically controlled initial pilot valve for controlling fluids. The valve has a main valve member in the form of a differential piston and the means to suppress pressure surges when the main valve closes. It includes an overflow channel that has a limited flow-through cross section between both sides of the main valve member, and whose cross section increasingly lessens in the final phase of the closing motion.

It has been noticed that cavitation occurs when magnetic valves are closed abruptly, such as in magnetic valves that are used to control water flow in devices like dishwashers and washing machines, particularly those with servocontrol valve functions. This causes noises similar to hammer blows. Additionally, on the inlet side, an impact-like increase in pressure is noted. Efforts have been made to protect against these types of pressure surges by using elastic hoses as inlet and outlet lines. Recently, however, for safety reasons, the magnetic valves in question have been installed directly on the water faucet, and/or linked to the feeding system via lines that are as short as possible and relatively inelastic. For this reason, a proposal has already been made (European Patent No. 0,135,474) to create pressure equalization volumes operating by spring tension, on both the inlet and outlet sides. But such efforts to find a solution are expensive and costly. In addition, with own-medium-controlled magnetic valves, efforts have been made to lessen pressure surges on the inlet and outlet flow sides by giving the overflow channel of the servo valve mechanism a very small cross section, making it possible for the main valve to perform only a delayed closing. However, with this there is a danger that sedimentation and/or dirt particles carried by the controlled fluid will obstruct the channel, and the valve then will no longer be able to close.

Additionally, the German Patent Specification No. 976 465 describes an own-medium-controlled magnetic valve according to the generic name. It has an overflow channel that runs vertically through the main valve member, and its cross section is increasingly reduced during motion achieved by having a housing-stable conical pin project into the overflow channel. However, only a quite gradual cross section reduction of an overflow channel, which is relatively narrow even without this, can be achieved, so that the valve closes only after a time lag. Additionally, there is the danger that lime deposits will make the cross section relationships uncontrollable, and/or lead to abrasion of the overflow channel walls.

The French Patent Specification No. 1,514,837 offers a self-controlling magnetic valve, also generic, with a rubber elastic membrane that comes into contact on the one hand with the main valve seat, and on the other may be supported radially outside the main valve seat by a ring-shaped fold vis-a-vis the overpressure that acts on it from in the inlet side, under control of a ring-shaped member on a stiff plate surface of the main valve member. The ring-shaped member has, bilaterally, a collar of fine radial grooves, through which a pressure equalization is accomplished between the two sides of the main valve member. Although the flow-through cross section of the flow path so created, may be reduced toward the end of the closing motion with increasing contact pressure on the membrane, it cannot go toward zero, so that the closing still ends in with a relatively impact-type motion.

Additionally, the U.S. Pat. No. 2,870,986 offers a magnetic valve that in principle is similar, in which, with increasingly overpressure from the inflow side of the valve, an overflow channel in the main valve member is increasingly restricted in a way that is largely independent of the particular setting of the main valve member, so that the membrane is compressed into an annular groove of a plate-shaped support member. With the "reinforcement member" so created, the valve's flow rate should be stabilized in relation to the pressure that appears.

Here again, as in the other case, a danger exists that the flow-through cross section of the flow path in question can be reduced in the course of time by deposits.

SUMMARY OF THE INVENTION

Proceeding from this state of the art, the invention has the objective of creating a self-controlling magnetic valve.

This takes care to ensure that the closing process takes place while avoiding pressure surges on the inflow and outflow sides, while the valve moves rapidly and with a precision that remains the same over a lengthy period.

The overflow channel reduces in cross-sectional size by means of contact pressure of the main valve member on its valve seat. This reduction ensures that the overflow channel reduces in cross section only in the very last phase of the closing motion, but is reduced all the more emphatically. It should be noted that the valve's flow rate changes in the course of the closing motion with increasing gradients, so that the characteristics of the final phase of the closing motion are of decisive importance. The cross section reduction through the squeezing of the overflow channel that nonetheless depends on the input pressure of the fluid to be regulated, yields, in addition, a control process through which the closing rate of the valve in the critical end phase is largely independent of pressure. However, through mechanical effects of contact pressure by the main valve member on its valve seat, deposits are eliminated as soon as they occur.

In a particularly simple way, the choke channel can be configured in the elastic membrane of the main valve member that is customarily present in such valves. This is done in such a way that it can be squeezed together by contact of the membrane on the valve seat that goes with it. Additionally, measures can be taken to bypass the choke channel in question at the beginning of the closing process, and thus accelerate the closing process.

For a full understanding of the present invention, reference should now be made to the following detailed description of the preferred embodiments of the invention as illustrated in the accompanying drawings.

BRIEF DESCRIPTION OF THE DRAWINGS

FIG. 7: toward the end of the closing process of the main valve, and FIG. 8 with the main valve closed.

DESCRIPTION OF THE PREFERRED EMBODIMENTS

Figure 1:
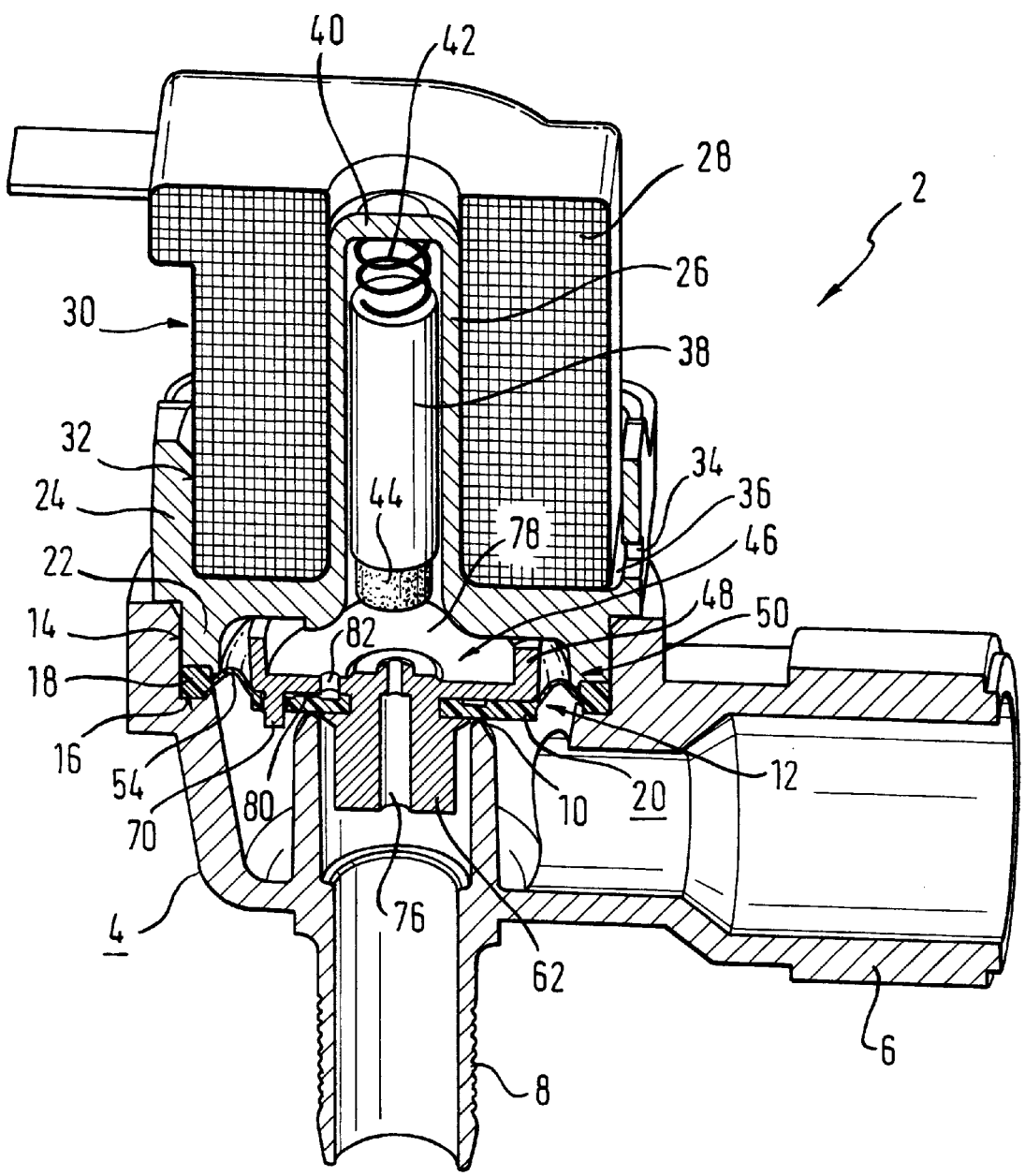
FIG. 1: A perspective drawing of the overall magnetic valve in cross section.
Figure 2:
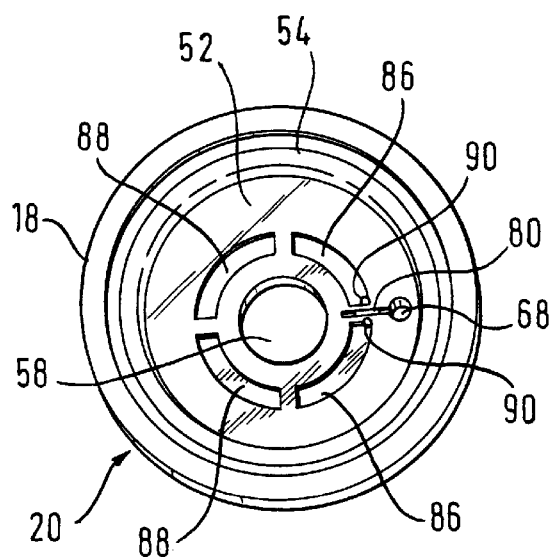
FIGS. 2 and 3: Various perspective drawings of the membrane of the main valve in question.
Figure 3:
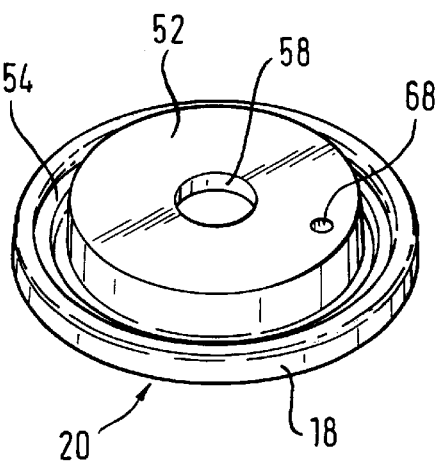
Figure 4:
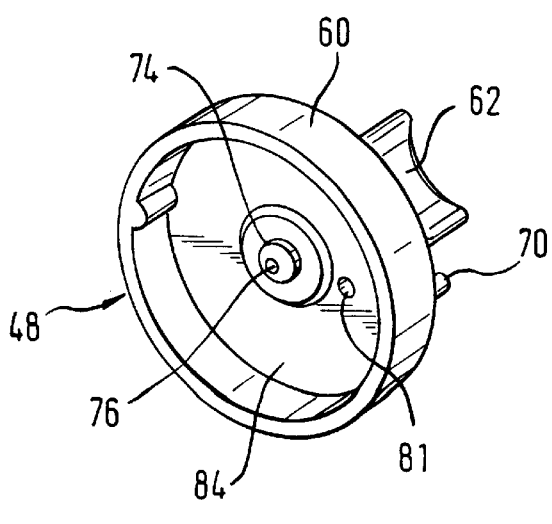
FIGS. 4 and 5: Various perspective drawings of a membrane insert which is applied in connection with the membrane from FIGS. 2 and 3.
Figure 5:
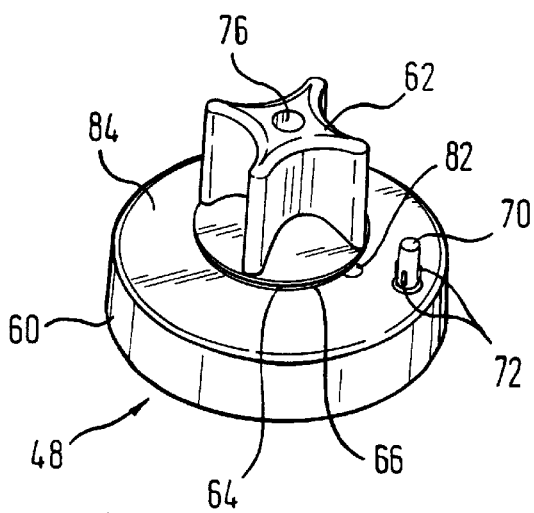

The present invention will now be described with reference to FIGS. 1–8 of the drawings. Identical elements in the various figures are identified by the same reference numerals.

The magnetic valve 2 shown has a valve body 4 with an inlet 6 that empties into it from the side, and an outlet 8 that runs downward, i.e., at right angles to inlet 6. In principle, the exterior section of outlet 8 could also be arrayed to be in alignment with inlet 6.

The inner end of this outlet 8 forms the annular valve seat 10 of main valve 12 ("main valve seat"). Above valve seat 10, and coaxial with it, a circular-cylindrical recess 14, open toward the top, is provided in valve body 4. This recess terminates in a shoulder 16, on the underside, approximately at the level of valve seat 10, The shoulder 16 forms a support for a peripheral band 18 of an elastic rubber membrane 20 of main valve 12 which is pressed in sealing fashion by a cylindrical flange 22 of a lid 24 onto shoulder 16. The lid 24 supports a central, stand-erect core guide pipe 26, which is surrounded by a hermetically encased magnet coil 28 of an electromagnetic switch system 30. Magnet coil 28 is contained in a recess 32 of lid 24 that fits it, by means of adjustment and locking devices 34 and 36.

A cylindrical plunger 38 of switch system 30 is supported so that it can glide in core guide pipe 26. On the upper side, this plunger 38 is subject to the force of a spiral compression spring 42 that acts from the closed end 40 of core guide pipe 26. The tapered lower end of plunger 38 has an elastic rubber cap 44, which forms the valve member of a pilot valve 46 for actuating the main valve 12. Together with membrane 20, a comparatively stiff membrane insert 48 forms the valve member 50 of the main valve ("main valve member").

As FIGS. 2–5 more exactly show, membrane 20 has a flat bottom 52 with a central shell-shaped piece surrounded by a thin-walled squeeze zone 54, to which band 18 adjoins on the outside. Floor 52 has a central opening 58. The membrane insert 48 essentially consists of a shell-shaped part 60 and a so-called top 62, coaxial with it, in the form of a roughly cross-shaped profiled plug, which adjoins shell-shaped part 60 via a flat base segment that has an annular groove 64. With the main valve member 50 mounted, the shell-shaped piece 60 comes to lie within the shell shaped piece from floor 52 and squeeze zone 54 of membrane 20, with the edge that surrounds central opening 58 of the membrane admitted by ring groove 64.

Eccentric to central opening 58, on a radius smaller than that of valve seat 10 (FIG. 1), the bottom 52 of membrane 20 has a perforation 68 bored through, and the membrane insert 48 has a pin 70 that extends loosely through perforation 68, which pin, relative to perforation 68, is centered via four ribs 72 arrayed crosswise on it. Additionally, in membrane insert 48, there is a hole 76 bored through, extending from a central nipple 74 in the interior of its shell-shaped part 60 through the top 62. Along with the hole 76, the nipple 74 forms the valve seat of pilot valve 46.

Figure 6:
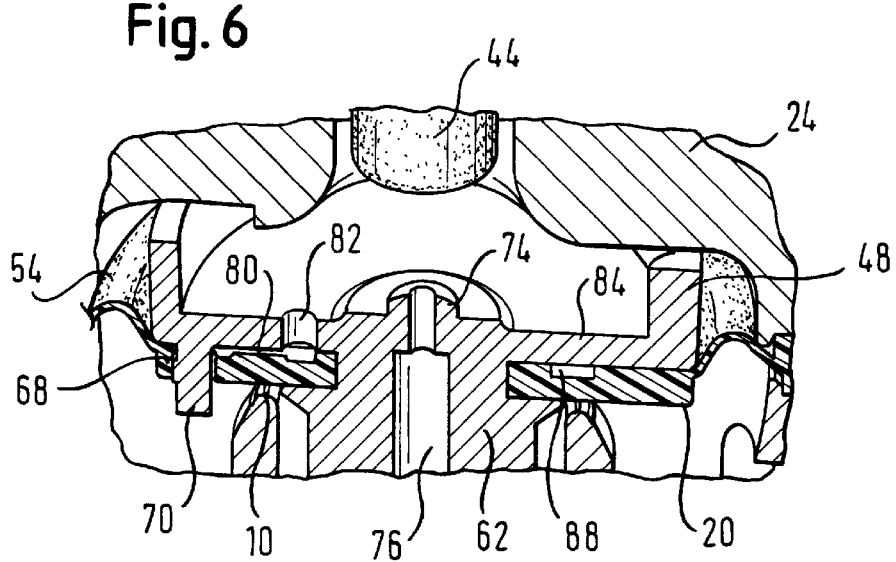
FIGS. 6, 7 and 8: Each show a detail section through the main valve area of the magnetic valve in question in various operational phases, namely, in FIG. 6 with the main valve open.
Figure 7:
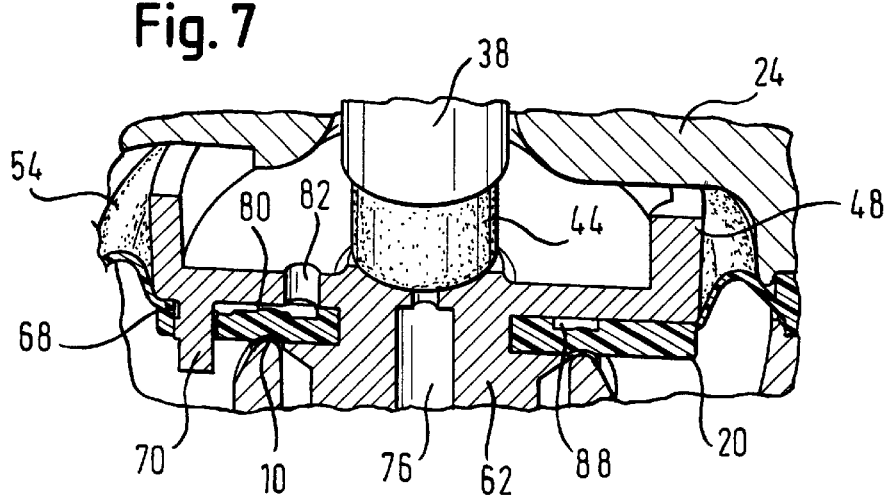
Figure 8:
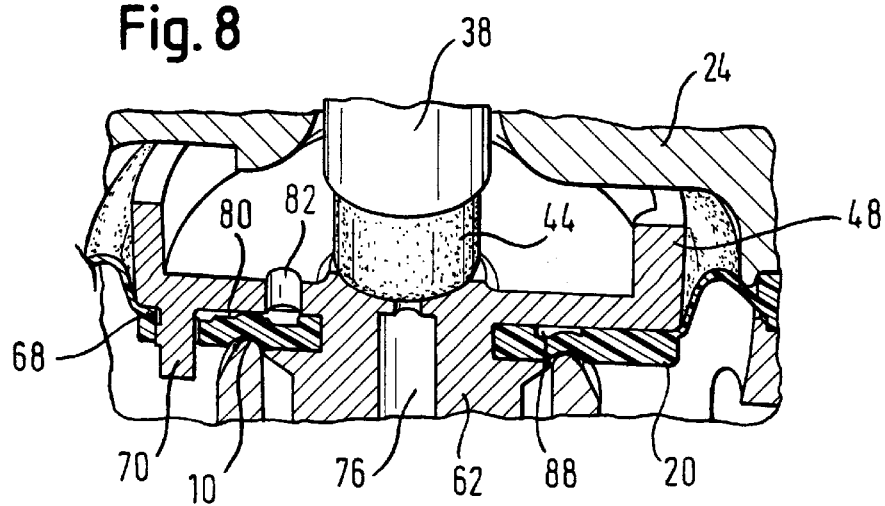

In this regard, the parts of magnetic valve 2 are the usual ones. Their function is the following:

If magnet coil 28 is excited, and plunger 38 is consequently drawn against the force of spring 42 into the setting depicted in FIG. 6, pilot valve 46 is opened. Lack of contact pressure on the part of the spring-loaded plunger 38, and the intrinsic elasticity of membrane 20, causes the membrane to assume a position removed from valve seat 10, creating the possibility for fluid located in the so-called pilot valve chamber 78 above membrane 20 to be able to flow away through hole 76 into outlet 8. In other words, main valve 12 is open.

If plunger 38 is released by de-excitation of magnet coil 28, then its elastic rubber cap 44 closes hole 76. Thus, the pilot valve 46 is closed. Simultaneously, spring-loaded plunger 38 seeks to press membrane 20 by means of membrane insert 48 downward, against valve seat 10. This is increasingly supported by the pressure being built up through perforation 68 of the membrane from the inlet side of magnetic valve 2 in the pilot valve chamber 78. In a normal instance this would result in the main valve member 50 impinging in impact fashion on valve seat 10, with main valve 12 closing likewise by impact. In contrast, efforts have been made until now, as stated earlier, to sometimes help by having the orifice cross section of an overflow channel, comparable to the perforation 68 of membrane 20, be designed to be very small. However, this resulted in the danger of its being obstructed unintentionally, as well as of an undesired delay in the closing process.

In the present case, however, perforation 68 can be designed to be sufficiently ample that obstruction is all but precluded. Care is taken to avoid a sudden closure of main valve 12 in the following manner:

In base 52 of membrane 20, extending from perforation 68, a radial choke channel 80 is located. This leads to a perforation 82 displaced radially inward in base 84 of the shell-shaped part 60 of membrane insert 48. As a result of this, the fluid passing through perforation 68 is forced to pass through choke chamber 80, in order to reach pilot valve chamber 78, as long as membrane 20 is in contact with the base of shell-shaped part 60.

Choke chamber 80 is open toward the base 84 of membrane insert 48. Its wall is elevated over the base of two flat cutouts 86 in base 52 that are ring segment shaped and adjoin it bilaterally, so that it is slightly deformable by resting pressure on the part of membrane insert 48, in a manner that its cross section in the clear may be reduced to zero. For reasons of symmetry, the two cutouts 86 are supplemented toward the opposite side by two recesses 88 that are likewise ring segment shaped, in order that, with them, they form a collar-shaped arrangement.

Two support members in the form of elastically deformable pins 90 project outward from the base of the ring segment shaped cutouts 86 above the remaining base surface. These pins endeavor to keep base 52 of the membrane separated from base 84 of membrane insert 48. However, they are sufficiently soft to yield to increased pressure on the part of the membrane insert, and thus allow the base 84 of the membrane insert to come into contact with base 52 of the membrane, so that henceforth fluids can get through from perforation 68 of the membrane to perforation 82 of the membrane insert only through choke channel 80. By this means, an initial reduction of inflow to the pilot valve chamber occurs with increasing pressure buildup as early as in the pilot valve chamber 78.

A further reduction down to zero finally takes place when, with further increasing pressure on the part of the pilot valve chamber 78, choke channel 80, which extends over the edge of valve seat 10, is squeezed together. In this way, inflow to pilot valve chamber 78 becomes increasingly difficult, so that main valve 12 closes smoothly in the final phase. This inflow hindrance is dependent on the amount of the pressure building up in pilot valve chamber 78. Therefore, the closing action in the final phase is largely independent of pressure.

It is noteworthy that the magnet valve 2 that has been described above by way of example differs from previous magnetic valves that lack any special means to reduce pressure surges. It differs in requiring replacement of only two parts, namely the membrane and the membrane insert. In this way, it is also conceivable that previous magnetic valves of this kind could be appropriately retrofitted in a simple manner.

There has thus been shown and described a novel magnetic valve which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a self-controlling magnetic valve, which is actuated by an electromagnetically controlled initial pilot valve for controlling fluids, and has a main valve member in the form of a differential piston and the means to suppress pressure surges when the main valve closes, with the inclusion of an overflow channel that has a limited flow-through cross section between both sides of the main valve member, and whose cross section increasingly lessens in the final phase of the closing motion, the improvement wherein the overflow channel comprises a choke channel formed in elastic material that is squeezed in the final phase of the main valve closing motion by pressure mechanically applied to said elastic material by contact pressure of the main valve member upon its valve seat in a manner to reduce the cross-section of said choke channel.

2. Magnetic valve according to claim 1, wherein the choke channel is configured in the main valve member.

3. Magnetic valve according to claim 2, wherein the choke channel is configured in a rubber elastic membrane of the main valve member.

4. Magnetic valve according to claim 3, wherein the choke channel extends to a membrane area between two perforations of the membrane and of a membrane insert, respectively, these perforations lying on different radii with respect to a center axis of both membrane and membrane insert, different radii.

5. Magnetic valve according to claim 4, wherein the wall of the choke channel is configured so as to rise above adjoining surface sections of the membrane.

6. Magnetic valve according to claim 5, wherein the adjoining surface sections are formed from the base of flat recesses of the membrane.

7. Magnetic valve according to claim 6, wherein the recesses, together with additional such recesses, are arranged about the center of the membrane in ring or collar form.

8. Magnetic valve according to claim 4, wherein the choke channel is open toward the side of the membrane insert.

9. Magnetic valve according to claim 4, further comprising at least one elastic support member that can be pressed flat, by which it endeavors to keep the membrane area apart from the membrane insert.

10. Magnetic valve according to claim 2, wherein the choke channel is squeezable by the contact pressure applied to the main valve member by the main valve seat.

* * * * *